US011760368B2

(12) United States Patent
Ma et al.

(10) Patent No.: US 11,760,368 B2
(45) Date of Patent: Sep. 19, 2023

(54) SYSTEM AND METHOD OF SAME-LOOP ADAPTIVE SIMULATION FOR AUTONOMOUS DRIVING

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 18/047,951

(22) Filed: Oct. 19, 2022

(65) Prior Publication Data
US 2023/0117019 A1    Apr. 20, 2023

Related U.S. Application Data

(60) Provisional application No. 63/257,527, filed on Oct. 19, 2021, provisional application No. 63/366,738, filed on Jun. 21, 2022.

(51) Int. Cl.
| | |
|---|---|
| *B60W 50/06* | (2006.01) |
| *B60W 60/00* | (2020.01) |
| *B60W 40/10* | (2012.01) |
| *G05B 17/02* | (2006.01) |

(52) U.S. Cl.
CPC ............ *B60W 50/06* (2013.01); *B60W 40/10* (2013.01); *B60W 60/001* (2020.02); *G05B 17/02* (2013.01); *B60W 2520/10* (2013.01); *B60W 2520/105* (2013.01); *B60W 2554/00* (2020.02)

(58) Field of Classification Search
CPC .... B60W 50/06; B60W 60/001; B60W 40/10; B60W 2554/00; B60W 2520/10; B60W 2520/105; G05B 17/02

USPC .......................................................... 701/27
See application file for complete search history.

(56) References Cited

U.S. PATENT DOCUMENTS

| | | | |
|---|---|---|---|
| 10,943,414 B1 | 3/2021 | Nygaard et al. | |
| 2018/0336424 A1 | 11/2018 | Jang et al. | |
| 2019/0180502 A1* | 6/2019 | England | G01S 7/417 |
| 2019/0278290 A1* | 9/2019 | Zhang | G01S 7/40 |
| 2020/0353943 A1* | 11/2020 | Siddiqui | G06N 3/045 |
| 2021/0107484 A1* | 4/2021 | Green | B60W 50/0097 |

(Continued)

FOREIGN PATENT DOCUMENTS

| | | | | |
|---|---|---|---|---|
| CN | 102073790 A | | 5/2011 | |
| CN | 111406278 A | * | 7/2020 | G05B 17/02 |

(Continued)

OTHER PUBLICATIONS

International Search Report and Written Opinion of the International Searching Authority dated Feb. 17, 2023 as received in Application No. PCT/US2022/047185.

*Primary Examiner* — Atul Trivedi
(74) *Attorney, Agent, or Firm* — Maschoff Brennan

(57) ABSTRACT

A method may include obtaining, by an autonomous driving system, input information relating to an autonomous vehicle (AV). The method may include determining, by the autonomous driving system, one or more driving signals that describe operations of the AV. The method may include instructing the AV to move according to the driving signals and simulating, by a virtual driving system, movement of the AV based on the driving signals, wherein the simulating the movement of the AV occurs concurrently with the AV moving according to the driving signals as instructed.

17 Claims, 6 Drawing Sheets

(56) References Cited

U.S. PATENT DOCUMENTS

| | | | |
|---|---|---|---|
| 2021/0166474 A1* | 6/2021 | Behar | G06V 20/56 |
| 2021/0287459 A1* | 9/2021 | Cella | G07C 5/0808 |
| 2021/0294944 A1* | 9/2021 | Nassar | B60W 50/00 |
| 2022/0048533 A1* | 2/2022 | Ödblom | G06F 11/3668 |
| 2022/0055641 A1* | 2/2022 | Wolff | G06N 20/00 |
| 2022/0058309 A1* | 2/2022 | Safira | G01S 17/10 |
| 2022/0185302 A1* | 6/2022 | Dev | B60W 50/06 |
| 2022/0229954 A1* | 7/2022 | Mittal | G06F 30/20 |
| 2022/0308577 A1* | 9/2022 | Pasch | G05D 1/0223 |
| 2023/0074387 A1* | 3/2023 | Goyal | G01C 21/3407 |

FOREIGN PATENT DOCUMENTS

| | | | | |
|---|---|---|---|---|
| CN | 111228804 B | * | 5/2021 | A63F 13/52 |
| CN | 114740752 A | * | 7/2022 | |
| CN | 115761686 A | * | 3/2023 | B60W 30/18018 |
| KR | 20190099088 A | * | 8/2019 | G01C 21/3602 |
| KR | 20210090314 A | * | 7/2021 | B60W 30/001 |
| WO | WO-2019199474 A1 | * | 10/2019 | B60W 30/0956 |
| WO | WO-2020205597 A1 | * | 10/2020 | B60W 40/09 |

\* cited by examiner

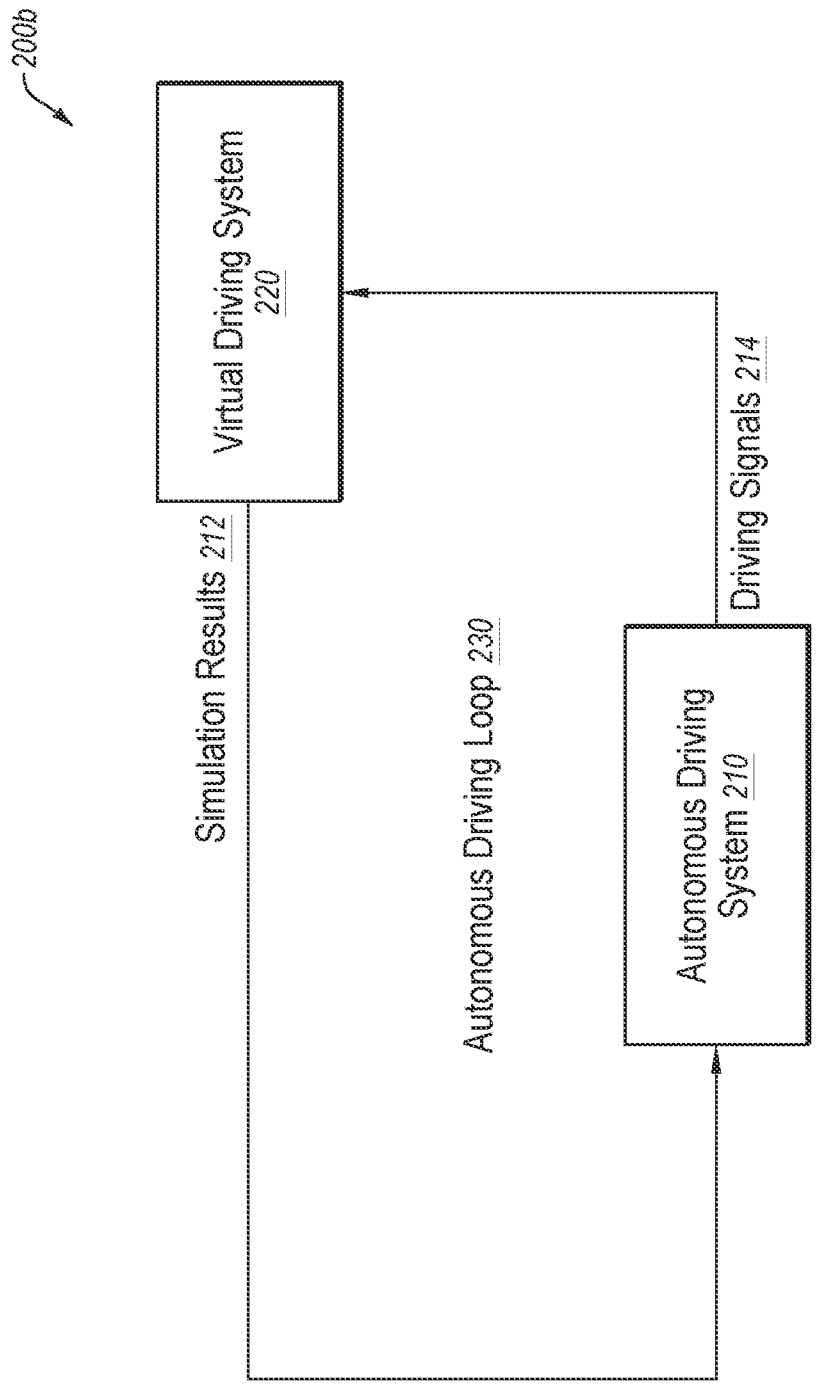

SYSTEM AND METHOD OF SAME-LOOP ADAPTIVE SIMULATION FOR AUTONOMOUS DRIVING

CROSS-REFERENCE TO RELATED APPLICATIONS

This application claims the benefit of U.S. Patent Application Ser. No. 63/257,527, filed on Oct. 19, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of same-loop adaptive simulation for autonomous driving.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining, by an autonomous driving system, input information relating to an autonomous vehicle (AV). The method may include determining, by the autonomous driving system, one or more driving signals that describe operations of the AV. The method may include instructing the AV to move according to the driving signals and simulating, by a virtual driving system, movement of the AV based on the driving signals. The simulating the movement of the AV may occur concurrently with the AV moving according to the driving signals as instructed.

In some embodiments, the method may further include obtaining, by the autonomous driving system, the simulated movement of the AV and determining, by the autonomous driving system, one or more updated driving signals based on the simulated movement of the AV.

In some embodiments, the simulating the movement of the AV may be completed after the AV begins moving according to the instructing the AV to move according to the driving signals.

In some embodiments, the simulating the movement of the AV may be completed before the AV arrives at a destination position corresponding to the driving signals.

In some embodiments, simulating the movement of the AV may include estimating a projected motion path of the AV and a destination position of the AV based on the input information relating to the AV.

In some embodiments, simulating the movement of the AV may include obtaining parameters corresponding to the AV from a user and estimating a projected motion path of the AV and a destination position of the AV based on the parameters.

In some embodiments, the input information relating to the AV may include at least one of: a position of the AV, an orientation of the AV, a speed of the AV, an acceleration of the AV, a localization of the AV, technical specifications of the AV, information about objects in a vicinity of the AV, and an operating environment of the vehicle.

One or more embodiments of the present disclosure may include an autonomous vehicle (AV) that includes an autonomous driving system configured to obtain input information relating to the AV, determine one or more driving signals that describe operations of the AV, and instruct the AV to move according to the driving signals. The AV may include a virtual driving system configured to obtain the driving signal from the autonomous driving system and simulate movement of the AV based on the driving signals. The simulating the movement of the AV may occur concurrently with the AV moving according to the driving signals as instructed.

In some embodiments, the autonomous driving system may be further configured to obtain the simulated movement of the AV and determine one or more updated driving signals based on the simulated movement of the AV.

In some embodiments, the simulating the movement of the AV may be completed after the AV begins moving according to the instructing the AV to move according to the driving signals.

In some embodiments, the simulating the movement of the AV may be completed before the AV arrives at a destination position corresponding to the driving signals.

In some embodiments, simulating the movement of the AV may include estimating a projected motion path of the AV and a destination position of the AV based on the input information relating to the AV.

In some embodiments, simulating the movement of the AV may include obtaining parameters corresponding to the AV from a user and estimating a projected motion path of the AV and a destination position of the AV based on the parameters.

In some embodiments, the input information relating to the AV may include at least one of: a position of the AV, an orientation of the AV, a speed of the AV, an acceleration of the AV, a localization of the AV, technical specifications of the AV, information about objects in a vicinity of the AV, and an operating environment of the vehicle.

One or more embodiments of the present disclosure may include one or more non-transitory computer-readable storage media configured to store instructions that, in response to being executed, cause a system to perform operations. The operations may include obtaining, by an autonomous driving system, input information relating to an autonomous vehicle (AV). The operations may include determining, by the autonomous driving system, one or more driving signals that describe operations of the AV. The operations may include instructing the AV to move according to the driving signals and simulating, by a virtual driving system, movement of the AV based on the driving signals. The simulating the movement of the AV may occur concurrently with the AV moving according to the driving signals as instructed.

In some embodiments, the operations may further include obtaining, by the autonomous driving system, the simulated movement of the AV and determining, by the autonomous driving system, one or more updated driving signals based on the simulated movement of the AV.

In some embodiments, the simulating the movement of the AV may be completed after the AV begins moving according to the instructing the AV to move according to the driving signals.

In some embodiments, the simulating the movement of the AV may be completed before the AV arrives at a destination position corresponding to the driving signals.

In some embodiments, simulating the movement of the AV may include estimating a projected motion path of the AV and a destination position of the AV based on the input information relating to the AV.

In some embodiments, simulating the movement of the AV may include obtaining parameters corresponding to the AV from a user and estimating a projected motion path of the AV and a destination position of the AV based on the parameters.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIGS. 2A and 2B illustrate an example embodiment of a system architecture for same-loop adaptive simulations and computations according to one or more embodiments of the present disclosure;

DETAILED DESCRIPTION

Figure 1:
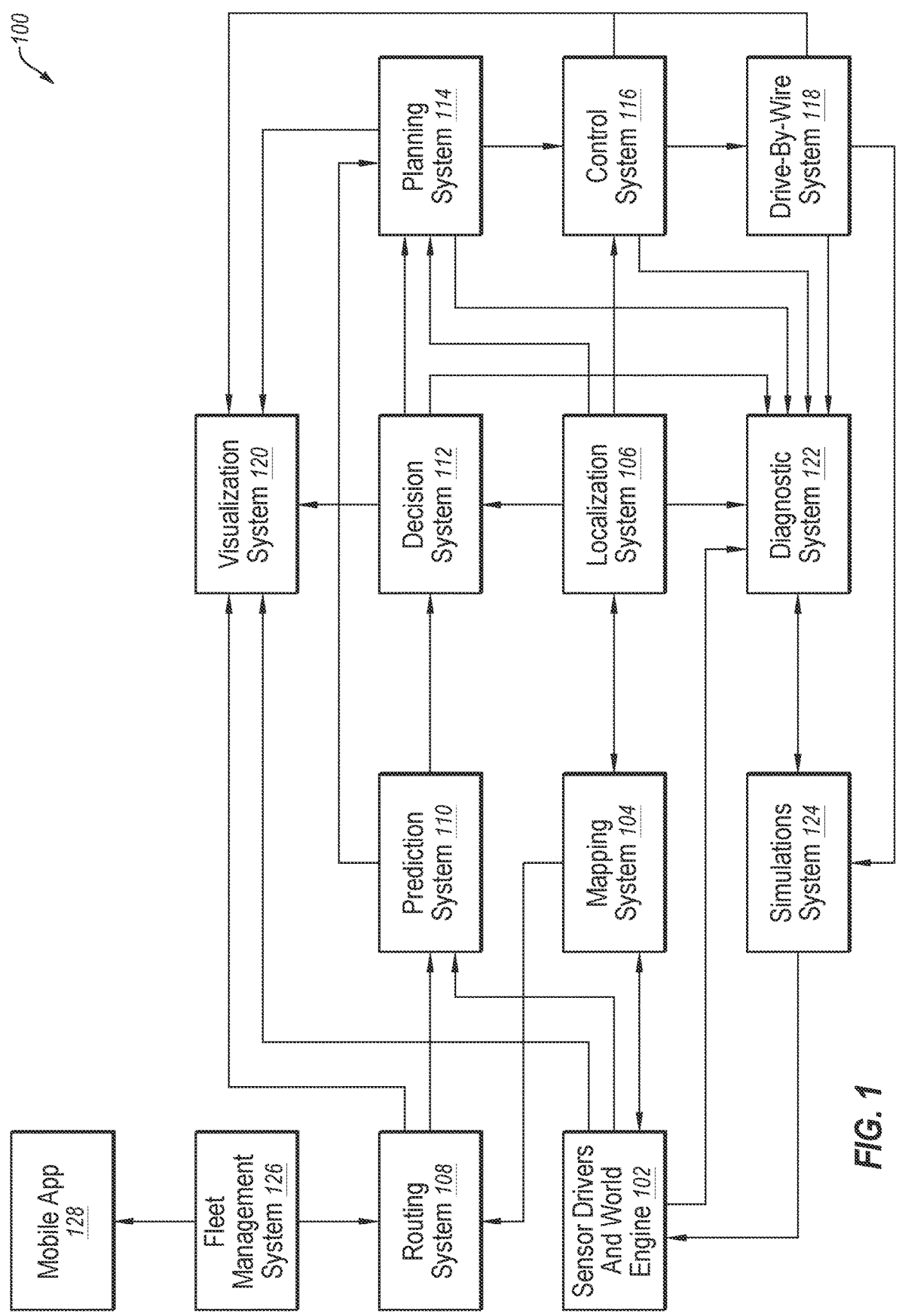
FIG. 1 illustrates an example embodiment of an autonomous driving system according to one or more embodiments of the present disclosure.

An autonomous vehicle (AV) may perform computations based on information about an environment in which the AV is operating to determine how to navigate the environment safely and efficiently. In some systems, the AV may execute one or more possible movement scenarios in a simulated setting before performing such movements in real world situations. However, in existing circumstances of simulation, the movement scenarios simulated by the AV may not be modeled based on the information describing the present environment of the AV. Consequently, the simulated movement scenarios may not accurately reflect situations that are likely to arise in the real operating environment of the AV.

An autonomous driving system used to control processes associated with existing AVs may involve multiple computing subsystems and/or routines that are configured to operate together to facilitate safe driving of the AV. The autonomous driving system may include, for example, sensors for collecting information about an environment in which the AV operates, a perception system that is configured to process the collected sensor data, a localization system, a routing system, a prediction system, a decision-making system, any other computing subsystems, or some combination thereof. In some situations, the computing subsystems may operate and/or be developed separately from one another. For example, Light Detection And Ranging (LiDAR) sensors used with the autonomous driving system may have been developed with aviation and/or meteorology applications in mind such that the software associated with the LiDAR sensors and/or the data collected by the LiDAR sensors may or may not be tailored for autonomous vehicle driving, such as with the perception system of the AV in consideration. As an additional or alternative example, different localization systems may be designed and implemented by different autonomous driving systems with each of the different localization systems including computational nuances and distinctions relative to one another that may affect computational results even when using the same sensor input data. As an additional or alternative example, a decision-making system and/or a control system used for autonomous driving may or may not be designed with a specific type of vehicle and/or with specific vehicle characteristics in mind such that AVs that differ from the specific type and/or characteristics corresponding to the decision-making system and/or the control system may experience computational errors and/or inaccuracies.

Consequently, one or more of the computing subsystems associated with the autonomous driving system of the AV may or may not be operating under the same computational loop either in simulation and/or in real-world operation. Differences relating to operational algorithms, data formats, data pipelines, code execution efficiency, system topology, code versioning, assumptions, or any other properties of the computing subsystems may lead to unexpected computational problems arising when the computing subsystems are brought together as part of the autonomous driving system and operate without being part of the same computational loop. Computations that are performed in the same computational environment, such as with respect to the same vehicle (or vehicles that include the same technical specifications), and using the same input information, such as the same position of the vehicle, the same positions of objects in the vicinity of the vehicle, and/or the same operating environment of the vehicle, may be considered as being performed as part of the same computational loop. In some situations, a given autonomous driving system that includes state of the art computing subsystem technology relating to sensors, perception, localization, prediction, decision-making, or any other processes of the given autonomous driving system may involve computing subsystems that are developed independently and may or may not include considerations relating to other computing subsystems associated with the autonomous driving system.

In some embodiments, a system and/or a method of same-loop adaptive simulations and computations according to the present disclosure may facilitate operations of the computing subsystems being processed as part of the same computational loop by applying one set of configuration settings to each of the computing subsystems such that the computations processed by the computing subsystems are deterministic. In other words, given a particular input and particular operating conditions, the output of the autonomous driving system that includes the same-loop adaptive simulations and computations as described according to one or more embodiments of the present disclosure may likely be the same.

The method and/or the system of same-loop adaptive simulations according to one or more embodiments of the present disclosure may be configured to simulate movements of a given AV using the same computational loop as the computational loop in which the operations of the given AV are processed. In other words, the same-loop adaptive simulations may be performed based on the actual environment in which the given AV is operating for autonomous driving computations rather than merely simulating potential movement scenarios that the given AV may or may not encounter during future operation.

Performing same-loop adaptive simulations and computations according to one or more embodiments as described in the present disclosure may be counterintuitive because the simulations and the computations may be performed concurrently and/or sequentially relative to one another. For example, a decision-making system of a given AV may output one or more driving decisions, and a simulation system configured to perform same-loop adaptive simulations may simulate driving the given AV based on the outputted driving decisions. In this and other examples, simulating the driving of the given AV based on driving decisions determined in the same computational loop may appear counterintuitive because the autonomous driving system associated with the given AV may have computed the driving decisions using the same input, and the simulation system may be expected to return information the same as or similar to the driving decisions outputted by the decision-making system. Or stated another way, the Av may have just undertaken the computational expense to determine the driving decision. As such, it would be counterintuitive to then expend further computing resources to run a simulation to validate the very directions that were just determined by the computing system of the AV. Additionally or alternatively, it may be unexpected that computational problems may arise during interoperation between computing subsystems of the autonomous driving system when each of the computing subsystems processing computations alone may not experience any such computational problems.

Controlling and/or simulating operations of the given AV according to one or more embodiments of the present disclosure may improve the safety and/or the efficiency of autonomous driving by more accurately assessing and simulating driving signals determined by computations of the given AV. Performing the same-loop adaptive simulations and/or computations according to the present disclosure may improve the accuracy and/or relevance of vehicle movement simulations and/or computations performed by the given AV because processing the computations of the autonomous driving system of the given AV may become deterministic at a system-wide level. In other words, given the same input and operating conditions, the autonomous driving system may be expected to generate computational outputs that are the same as simulated outputs output by a simulation system corresponding to the same autonomous driving system. Ensuring that the autonomous driving system operates deterministically may in turn facilitate futureproofing of the autonomous driving system by preventing software versioning errors and improving troubleshooting of the autonomous driving system.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control commands that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control commands implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
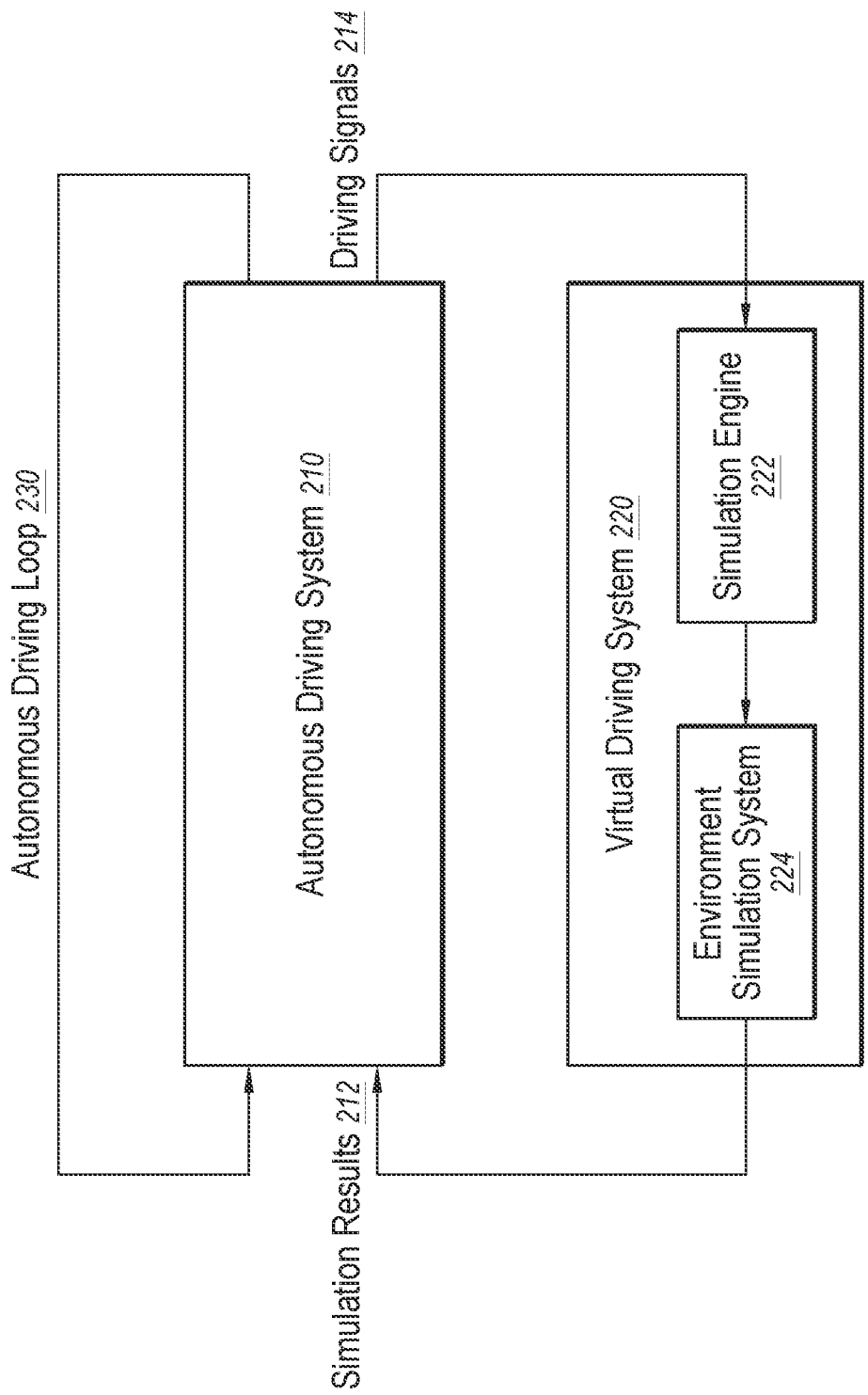

FIGS. 2A and 2B illustrate example embodiments of same-loop adaptive simulations and computations systems 200a and 200b according to the present disclosure. In some embodiments, the same-loop adaptive simulations and computations systems 200a and 200b may include an autonomous driving system 210 that is configured to obtain and process sensor data or any other types of input data collected from a surrounding environment around the AV and determine one or more driving signals to guide actual operations of the AV. In some embodiments, the autonomous driving system 210 may be the same as or similar to the autonomous driving system 100 described in relation to FIG. 1. The same-loop adaptive simulations and computations systems 200a and 200b may be configured so that a virtual driving system 220 is configured to operate concurrently with the autonomous driving system 210 and/or in sequence with the autonomous driving system 210. For example, as illustrated in FIG. 2A, the same-loop adaptive simulations and computations system 200a illustrates the autonomous driving system 210 and the virtual driving system 220 operating in parallel and concurrently with each other. As an additional or alternative example and as illustrated in FIG. 2B, the same-loop adaptive simulations and computations system 200b illustrates the autonomous driving system 210 and the virtual driving system 220 operating in sequence so that driving signals 214 output by the autonomous driving system 210 are obtained by the virtual driving system 220, and simulation results 212 output by the virtual driving system 220 are obtained by the autonomous driving system 210 in an iterative and looping process.

In some embodiments, the autonomous driving system 210 may include a perception system, a localization system, a mapping system, and/or any other computing systems such that the captured sensor data may be processed to generate a map of the environment surrounding the AV and localize the AV and one or more objects in the vicinity of the AV within the generated map. Based on the locations, orientations, and/or movements of the AV and/or the locations, orientations, and/or movements of the surrounding objects, the autonomous driving system 210 may determine driving signals 214 that facilitate safe operation of the AV through the mapped environment (e.g., while avoiding collisions with the surrounding objects and/or obeying traffic rules corresponding to the mapped environment) to guide the AV towards a given destination. The driving signals 214 may correspond to one or more control commands that may be used by the AV to facilitate physical movement of the AV. For example, a given driving signal 214 indicating that a given AV at rest should drive along a straight path towards a destination position may be converted into a series of control commands that include accelerating to a given speed, driving at the given speed for a given duration of time, decelerating for a given duration of time, and stopping at the destination position. As another example, the driving signals 214 may be based on a desired trajectory of the AV and the driving signals may be utilized to cause the vehicle to be at a series of points along the trajectory at projected points through time. In this and other examples, the series of control commands may be implemented by the given AV, such as by a drive-by-wire system of the given AV.

The driving signals 214 determined by the autonomous driving system 210 may be obtained by the virtual driving system 220. In some embodiments, a simulation engine 222 of the virtual driving system 220 may be configured to simulate operations of the AV responsive to the driving signals 214 obtained from the autonomous driving system 210. Or in other words, the virtual driving system 220 may give the AV an opportunity to simulate or observe the effect of the generated driving signals 214 for a given predictive window of time prior to actually operating the AV via the driving signals 214 in the given window of time. In some embodiments, the simulation engine 222 may simulate the operations of one or more of the computing systems of the autonomous driving system 210 (e.g., the perception system, the localization system, etc.) multiple times to ensure that the simulations of the simulation engine are consistent between the multiple simulations. In these and other embodiments, the simulation engine 222 may simulate the operations of the AV according to a world simulation approach and/or a log simulation approach.

In some embodiments, the simulation engine 222 may utilize the log simulation approach to simulate movement of the AV and/or objects in the vicinity of the AV. In the log simulation approach, previously recorded sensor data relating to the environment of the AV (including objects in the vicinity of the AV) and/or information about movement of the AV (e.g., "logged" information relating to the AV and its environment) may be used to generate a simulation scenario. As such, the simulation scenario that the simulation engine 222 uses in the log simulation approach may include a low-cost generation of simulation scenarios that are highly representative of the real world as they are based on the actually sensed data.

Additionally or alternatively, the simulation engine 222 may utilize the world simulation approach to simulate the AV and/or nearby objects. The world simulation approach may include a user-generated simulation scenario in which a user specifies one or more aspects relating to the AV, the environment, and/or the nearby objects. For example, the user may generate a given simulation scenario in which the AV is directly driving towards a moving object (e.g., an oncoming vehicle), and the simulation engine 222 may simulate operations of the AV that would allow the AV to safely navigate around the moving object. As such, the simulation scenario that the simulation engine 222 uses in the world simulation approach may facilitate more specifically tailored driving testing of the AV.

In these and other embodiments, the simulation scenario may be user-selected or may be automatically generated by a machine learning system. Such a machine learning system may, for example, predict or select a set number of likely scenarios that an AV is likely to encounter in operation. The machine learning system may provide a list of the likely scenarios to a user for manual generation, or the scenarios may be automatically generated such that the simulation of the operation of the AV in these world scenarios may be tested.

The simulation engine 222 using either or both the log simulation approach and/or the world simulation approach because the autonomous driving system 210 on which the simulation engine 222 bases simulated operations may be a complex computing system that is also life-critical for safe driving of the AV alongside other vehicles. A combination of simulation approaches that includes the log simulation approach and/or the world simulation approach may provide a rich set of simulation data that covers a threshold target of completeness of practical scenarios that the AV may encounter during operation. In some situations, the log simulation approach may facilitate capturing information relating to real-world scenarios that one or more AVs have encountered. The scenarios captured according to the log simulation approach may include data noise that is very similar to future scenarios that AVs may experience during real operation. In some situations, the world simulation approach may facilitate generating controlled scenarios that may be difficult to replicate using real-world information as used in the log simulation approach. As such, the world simulation approach may facilitate simulation of a broader range of scenarios than the log simulation approach, which may allow more thorough testing and analysis of the computations processed by the autonomous driving system.

Because the same-loop adaptive simulations and computations system 200a and 200b may have a core driving computation loop operating in parallel with a simulation computation loop under the same or similar computation conditions, the simulations output by the simulation computation loop are likely to be consistent with the driving signals and/or other results output by the core driving computation loop. In contrast, existing simulation computation systems that operate independently from autonomous driving systems of AVs may experience versioning differences, computational environment discrepancies, and/or other inconsistencies, which may prevent simulation results output by the existing simulation computation systems from being applicable to various autonomous driving systems. Consequently, existing simulation computation systems relating to autonomous driving may be inefficient and need to perform redundant simulation operations (e.g., running the same or similar driving simulations) over time to ensure that the simulation results are relevant to a given autonomous driving system.

In some embodiments, an environment simulation system 224 of the virtual driving system 220 may determine a projected localization of the AV during and/or after performing the simulated operations determined by the simulation engine 222. Additionally or alternatively, the environment simulation system 224 may simulate relative positions corresponding to the objects included in the environment around the AV during and/or after performing the simulated operations. The virtual driving system 220 may be configured to identify potential and/or simulated collisions and/or other interactions with objects or the environment based on the projected localization of the AV and the simulated relative positions of the objects near the AV. For example, the virtual driving system 220 may determine that a given simulated AV will collide with an oncoming vehicle (e.g., a simulated moving object) because the projected localization of the given simulated AV overlaps with the simulated relative position of the oncoming vehicle at one or more points of time.

In some embodiments, the virtual driving system 220 may send simulation results 212 of the AV output by the simulation engine 222 and/or the environment simulation system 224 back to the autonomous driving system 210 such that the autonomous driving system 210 may implement the driving signals 214 corresponding to the simulated movements of the AV to affect real movement of the AV. In these and other embodiments, sending the simulated movements may include sending only the driving signals 214 that dictate the simulated movements of the AV back to the autonomous driving system 210. Additionally or alternatively, the virtual driving system 220 may only transmit the updated simulated location of the AV and/or the updated simulated relative locations of the objects near the AV to the autonomous driving system 210. Additionally or alternatively, the virtual driving system 220 may transmit some combination of the driving signals 214 that affected simulated movement of the AV and the updated simulated locations of the AV and/or the objects to the autonomous driving system 210. Additionally or alternatively, the virtual driving system 220 may send a result of the simulation, such as a positive message (e.g., simulation successful, no collisions observed, etc.), a warning message (e.g., close call to a collision, slow speeds required, etc.), or a negative message (e.g., collision observed, speed thresholds not met, vehicle becomes stuck, etc.), to the autonomous driving system 210 to inform the autonomous driving system 210 whether the driving signals 214 corresponding to the simulated driving behavior of the AV are likely to be safe.

Based on the simulation results of the virtual driving system 220, the autonomous driving system 210 may determine whether the corresponding driving signals 214 affect a valid movement of the AV (e.g., avoids collisions with nearby objects and/or obeys relevant traffic rules) in the real world. Because the movement of the AV simulated by the virtual driving system 220 may closely correspond to the sensor data captured by the autonomous driving system 210 at the same point in time (e.g., within the "same loop" of data processing and analysis), any errors in the simulated movement of the AV are likely to correspond to a same or similar error in the movement of the AV in the real world. As such, the autonomous driving system 210 may be configured to redetermine one or more of the driving signals 214 responsive to receiving simulated movement of the AV and/or simulated relative movement of the surrounding objects that indicate a collision scenario, a traffic rule violation, and/or any other errors. Additionally or alternatively, real movements of the AV detected and/or dictated by the autonomous driving system 210 may closely correspond to the simulated movements generated by the virtual driving system 220 at the same point in time. The virtual driving system 220 may accurately and/or efficiently simulate movements of the AV responsive to errors that have occurred or are occurring in the real environment as determined by the autonomous driving system 210.

Modifications, additions, or omissions may be made to the same-loop adaptive simulations and computations systems 200a and 200b without departing from the scope of the present disclosure. For example, the designations of different elements in the manner described is meant to help explain concepts described herein and is not limiting. For instance, in some embodiments, the autonomous driving system 210 and the virtual driving system 220 are delineated in the specific manner described to help with explaining concepts described herein but such delineation is not meant to be limiting. Further, the same-loop adaptive simulations and computations systems 200a and 200b may include any number of other elements or may be implemented within other systems or contexts than those described.

Figure 3:
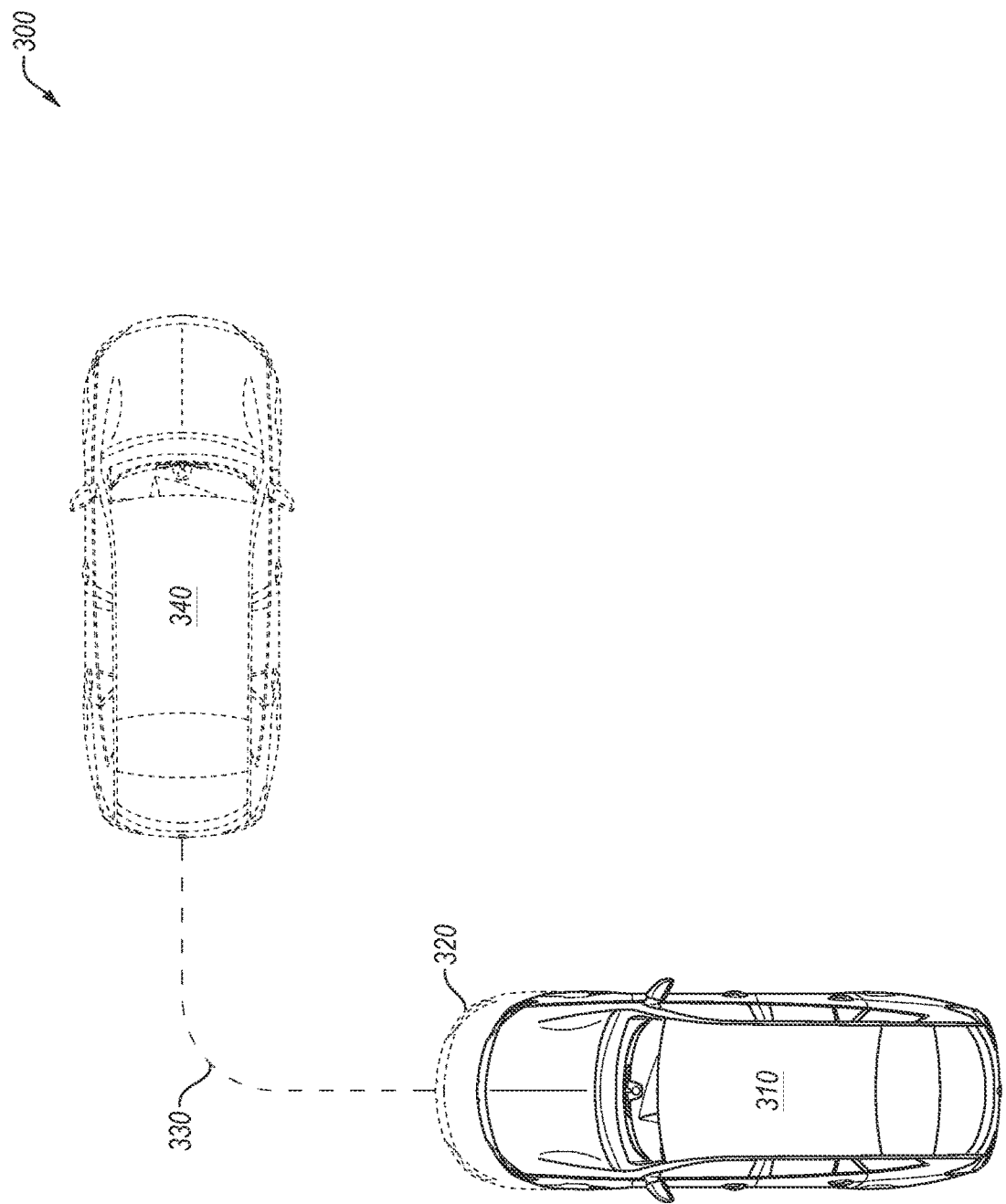
FIG. 3 illustrates an example vehicle that implements the same-loop adaptive simulations and computations system according to one or more embodiments of the present disclosure.

FIG. 3 illustrates an example operating environment 300 including a vehicle 310 that implements the same-loop adaptive simulations and computations system according to one or more embodiments of the present disclosure. In some embodiments, the same-loop adaptive simulations and computations system may be the same as or similar to the same-loop adaptive simulations and computations systems 200a and 200b described in relation to FIG. 2. The same-loop adaptive simulations and computations system may be implemented by the vehicle 310 to facilitate processing of driving computations and/or simulations. The same-loop adaptive simulations and computations system of the vehicle 310 may include an autonomous driving system that is the same as or similar to the autonomous driving system 210 described in relation to FIG. 2.

The autonomous driving system of the vehicle 310 may compute a given driving signal that indicates the vehicle 310 should drive along a projected motion path 330 towards a destination position 340. In some embodiments, the same-loop adaptive simulations and computations system of the vehicle 310 may be configured to perform simulations relating to the given driving signal to determine whether the given driving signal is safe to execute by the vehicle 310. In these and other embodiments, the same-loop adaptive simulations and computations system of the vehicle 310 may perform one or more simulations corresponding to the given driving signal before the vehicle 310 moves according to the given driving signal.

Additionally or alternatively, the same-loop adaptive simulations and computations system of the vehicle 310 may perform the simulations corresponding to the given driving signal concurrently while the vehicle 310 drives towards the destination position 340. For example, the same-loop adaptive simulations and computations system may be configured to perform and complete the simulations corresponding to the given driving signal by the time the vehicle 310 has moved to a projected future position 320. As an additional or alternative example, the same-loop adaptive simulations and computations system may be configured to perform and complete the simulations corresponding to the given driving signal before the vehicle 310 has moved to a projected future position anywhere along the projected motion path 330, such as completing the simulations prior to the vehicle 310 arriving at the destination position 340.

Figure 4:
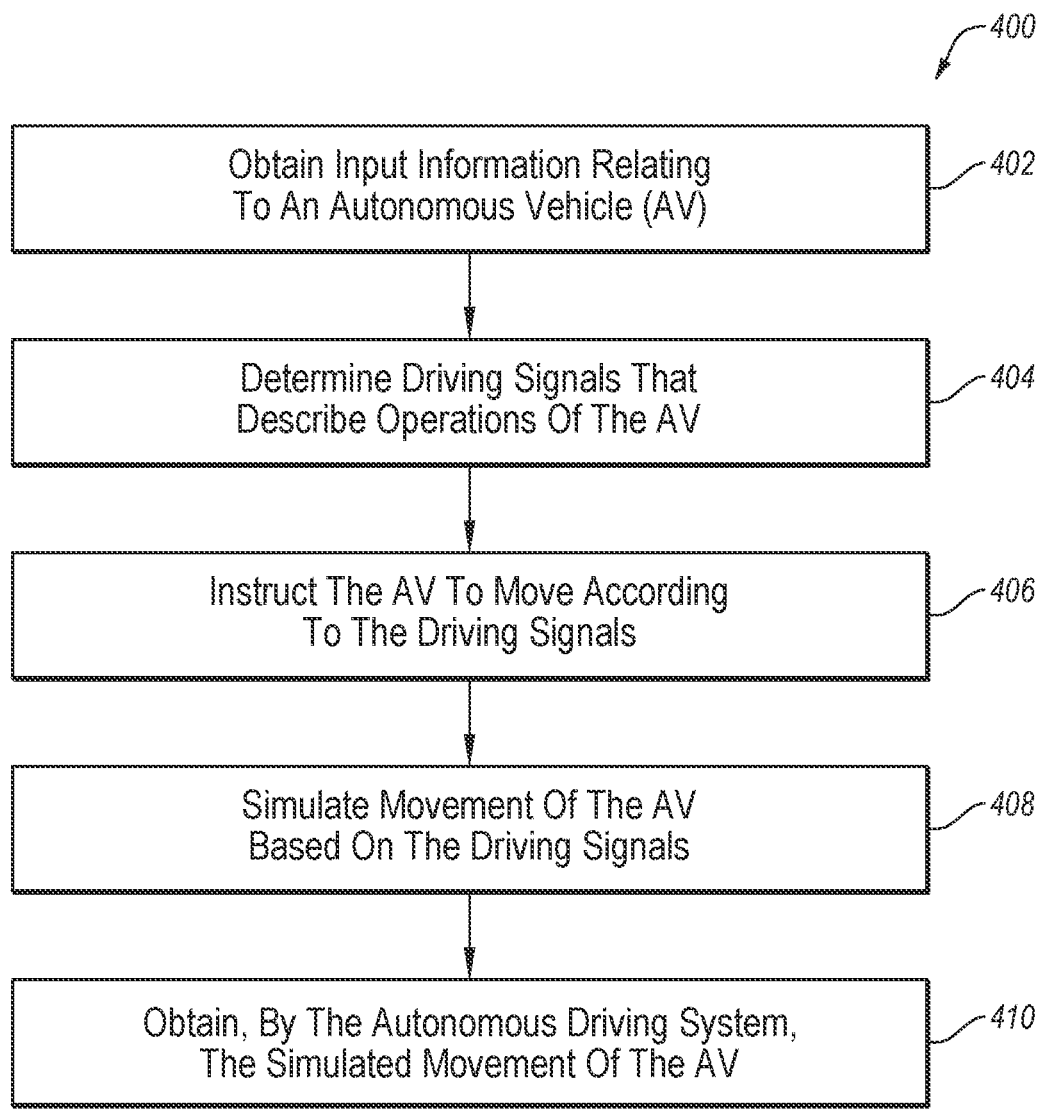
FIG. 4 is a flowchart of an example method of performing same-loop adaptive simulations and computations according to one or more embodiments of the present disclosure.

FIG. 4 is a flowchart of an example method of performing same-loop adaptive simulations and computations according to one or more embodiments of the present disclosure. The method 400 may be performed by any suitable system, apparatus, or device. For example, the autonomous driving system 210, the virtual driving system 220, the simulation engine 222, and/or the environment simulation system 224 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where an autonomous driving system may obtain input information relating to a given AV. In some embodiments, the input information obtained by the autonomous driving system may include intrinsic properties (e.g., vehicle make or model, vehicle dimensions, or any other properties specific to the given AV) and/or extrinsic properties (e.g., a tire tread depth, fuel tank level, brake pad condition, or any other properties that may or may not change over time) of the given AV. For example, the input information may include a position of the AV, an orientation of the AV, a speed of the AV, an acceleration of the AV, a localization of the AV, technical specifications of the AV, any other properties relating to the given AV, or some combination thereof. Additionally or alternatively, the input information may include intrinsic properties and/or extrinsic properties of an environment around the given AV that may affect the given AV during operation of the given AV. For example, the input information may include information about objects in the vicinity of the AV, road parameters relating to the road on which the AV is operating, climate or weather conditions that affect an operating environment of the AV, any other properties relating to the environment around the given AV, or some combination thereof.

At block 404, the autonomous driving system may determine one or more driving signals that describe operations of the given AV. The driving signals may involve control commands that may be implemented by the given AV, such as by a drive-by-wire system of the given AV, to affect a physical operation related to movement of the given AV. For example, a given driving signal for making a right or a left turn may involve a series of control commands that includes accelerating to a given speed, driving in a first direction without turning the given AV for a first duration, steering the given AV to make a turn, driving in a second direction without turning the given AV for a second duration, and decelerating to a stop to affect a left or a right turn for the given AV. As another example, the given driving signals may include a series of points in a trajectory window (e.g., a thirty-second window, a twenty-second window, a ten-second window, a five-second window, a three-second window, a one-second window, a fifty-millisecond window, or any other length of trajectory windows).

At block 406, the given AV may be instructed to move according to the driving signals. In some embodiments, the instructions may include one or more control commands that interpret the driving signals and provide one or more operations that the given AV may perform to affect physical movement according to the driving signals.

At block 408, a virtual driving system may simulate movement of the given AV based on the driving signals in which the simulating the movement of the given AV occurs concurrently with the instructing the given AV to move according to the driving signals. Simulating the movement of the given AV may involve estimating a projected motion path of the given AV and/or a destination position of the given AV. In some embodiments, the estimating of the projected motion path and/or the destination position may be performed according to a log simulation approach that uses the input information relating to the given AV for the simulations. Additionally or alternatively, the estimating of the projected motion path and/or the destination position may be performed based on parameters corresponding to the given AV specified by a user. The user may design simulation scenarios to determine how the given AV may behave in such simulation scenarios that may or may not be readily available for analysis using only logged input information. In some embodiments, the simulating of the movement of the given AV may be completed before the AV arrives at a destination position corresponding to the driving signals. Additionally or alternatively, the simulating of the movement of the given AV may be completed before the AV arrives at a destination position corresponding to the driving signals.

At block 410, the autonomous driving system may obtain the simulated movement of the given AV. In some embodiments, the autonomous driving system may determine one or more updated driving signals based on the simulated movement of the given AV. The simulated movement of the given AV as determined by the virtual driving system may be used to inform determination of the updated driving signals by the autonomous driving system in an iterative manner so that the determination of driving signals may be informed by the simulated movements of previous driving signals.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
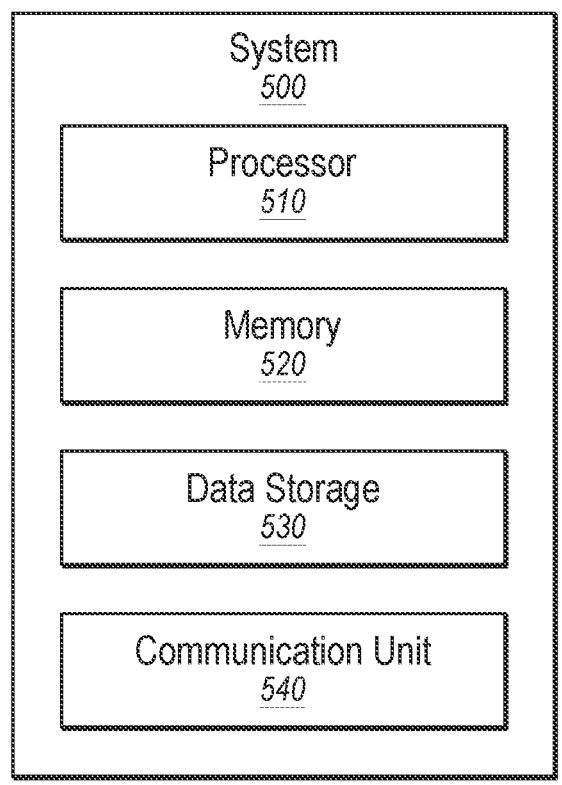
FIG. 5 is an example computing system.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the same-loop adaptive simulations and computations systems 200a and 200b of FIG. 2 may be implemented as a computing system consistent with the computing system 500, including the autonomous driving system 210 and the virtual driving system 220.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform operations associated with the autonomous driving system 210 and the virtual driving system 220. For example, the processor 510 may execute program instructions relating to the method 400, such as obtaining input information relating to an AV, determining driving signals that describe operations of the AV, instructing the AV to move according to the driving signals, simulating movement of the AV based on the driving signals, and/or sending the simulated movement of the AV to the autonomous driving system.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may store the input information collected by the autonomous driving system, the driving signals 214 determined by the autonomous driving system, and/or the simulation results 212 of the AV determined by the virtual driving system. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining, by an autonomous driving system, input information relating to an autonomous vehicle (AV) and objects in a vicinity of the AV;
   determining, by the autonomous driving system, one or more driving signals that describe operations of the AV;
   simulating, by a virtual driving system, a virtual driving environment using the input information obtained by the autonomous driving system and movement of the AV using the driving signals determined by the autonomous driving system, wherein the simulating the movement of the AV occurs concurrently with the AV performing operations according to the driving signals;
   obtaining, by the autonomous driving system, a projected future position of the AV corresponding to the simulated movement of the AV;
   determining whether operating the AV according to the driving signals with result in a collision scenario or a traffic rule violation based on the projected future position of the AV: and
   determining, by the autonomous driving system, one or more updated driving signals responsive to determining that operating the AV according to the driving signals will result in the collision scenario or the traffic rule violation.

2. The method of claim 1, wherein the simulating the movement of the AV is completed after the AV begins moving according to the instructing the AV to move according to the driving signals.

3. The method of claim 1, wherein the simulating the movement of the AV is completed before the AV arrives at a destination position corresponding to the driving signals.

4. The method of claim 1, wherein simulating the movement of the AV includes estimating a projected motion path of the AV and a destination position of the AV based on the input information relating to the AV.

5. The method of claim 1, wherein simulating the movement of the AV includes:
   obtaining parameters corresponding to the AV from a user; and
   estimating a projected motion path of the AV and a destination position of the AV based on the parameters.

6. The method of claim 1, wherein the input information relating to the AV includes at least one of: a position of the AV, an orientation of the AV, a speed of the AV, an acceleration of the AV, a localization of the AV, technical specifications of the AV, information about objects in a vicinity of the AV, and an operating environment of the vehicle.

7. An autonomous vehicle (AV), comprising:
   an autonomous driving system configured to:
   obtain, by an autonomous driving system, input information relating to an autonomous vehicle (AV) and objects in a vicinity of the AV;

determine, by the autonomous driving system, one or more driving signals that describe operations of the AV;

simulate, by a virtual driving system, a virtual driving environment using the input information obtained by the autonomous driving system and movement of the AV using the driving signals determined by the autonomous driving system, wherein the simulating the movement of the AV occurs concurrently with the AV performing operations according to the driving signals;

obtain, by the autonomous driving system, a projected future position of the AV corresponding to the simulated movement of the AV;

determine whether operating the AV according to the driving signals will result in a collision scenario or a traffic rule violation based on the projected future position of the AV; and determine, by the autonomous driving system, one or more updated driving signals responsive to determining that operating the AV according to the driving signals will result in the collision scenario or the traffic rule violation.

8. The AV of claim 7, wherein the simulating the movement of the AV is completed after the AV begins moving according to the instructing the AV to move according to the driving signals.

9. The AV of claim 7, wherein the simulating the movement of the AV is completed before the AV arrives at a destination position corresponding to the driving signals.

10. The AV of claim 7, wherein simulating the movement of the AV includes estimating a projected motion path of the AV and a destination position of the AV based on the input information relating to the AV.

11. The AV of claim 7, wherein simulating the movement of the AV includes:
obtaining parameters corresponding to the AV from a user; and
estimating a projected motion path of the AV and a destination position of the AV based on the parameters.

12. The AV of claim 7, wherein the input information relating to the AV includes at least one of: a position of the AV, an orientation of the AV, a speed of the AV, an acceleration of the AV, a localization of the AV, technical specifications of the AV, information about objects in a vicinity of the AV, and an operating environment of the vehicle.

13. One or more non-transitory computer-readable storage media configured to store instructions that, in response to being executed, cause a system to perform operations, the operations comprising:

obtain, by an autonomous driving system, input information relating to an autonomous vehicle (AV) and objects in a vicinity of the AV;

determine, by the autonomous driving system, one or more driving signals that describe operations of the AV;

simulate, by a virtual driving system, a virtual driving environment using the input information obtained by the autonomous driving system and movement of the AV using the driving signals determined by the autonomous driving system, wherein the simulating the movement of the AV occurs concurrently with the AV performing operations according to the driving signals;

obtain, by the autonomous driving system, a projected future position of the AV corresponding to the simulated movement of the AV;

determine whether operating the AV according to the driving signals will result in a collision scenario or a traffic rule violation based on the projected future position of the AV; and determine, by the autonomous driving system, one or more updated driving signals responsive to determining that operating the AV according to the driving signals will result in the collision scenario or the traffic rule violation.

14. The one or more non-transitory computer-readable storage media of claim 13, wherein the simulating the movement of the AV is completed after the AV begins moving according to the instructing the AV to move according to the driving signals.

15. The one or more non-transitory computer-readable storage media of claim 13, wherein the simulating the movement of the AV is completed before the AV arrives at a destination position corresponding to the driving signals.

16. The one or more non-transitory computer-readable storage media of claim 13, wherein simulating the movement of the AV includes estimating a projected motion path of the AV and a destination position of the AV based on the input information relating to the AV.

17. The one or more non-transitory computer-readable storage media of claim 13, wherein simulating the movement of the AV includes:
obtaining parameters corresponding to the AV from a user; and
estimating a projected motion path of the AV and a destination position of the AV based on the parameters.

* * * * *